(12) United States Patent
Woerner et al.

(10) Patent No.: US 7,803,868 B2
(45) Date of Patent: Sep. 28, 2010

(54) ADDITION-CROSSLINKABLE SILICONE COMPOSITIONS WITH LOW COEFFICIENTS OF FRICTION

(75) Inventors: Christof Woerner, Burghausen (DE); Willi Primas, Simbach (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 12/026,568

(22) Filed: Feb. 6, 2008

(65) Prior Publication Data
US 2008/0200609 A1      Aug. 21, 2008

(30) Foreign Application Priority Data
Feb. 15, 2007   (DE)  ............... 10 2007 007 569

(51) Int. Cl.
*C08L 83/07*   (2006.01)
(52) U.S. Cl. ............... 524/588; 524/861; 524/863; 524/492
(58) Field of Classification Search ........ 524/492, 524/588, 861, 863
See application file for complete search history.

(56) References Cited

U.S. PATENT DOCUMENTS

| 6,245,875 | B1 * | 6/2001 | Wang ............... 528/25 |
| 6,663,967 | B1 | 12/2003 | Ziebell |
| 7,148,306 | B2 * | 12/2006 | Achenbach et al. ......... 528/32 |
| 2004/0028854 | A1 | 2/2004 | Bosshammer et al. |
| 2006/0106156 | A1 * | 5/2006 | Woerner ............ 524/588 |
| 2006/0258819 | A1 * | 11/2006 | Woerner ............ 525/477 |

FOREIGN PATENT DOCUMENTS

| EP | 0649877 | A2 | 4/1995 |
| EP | 0834534 | A1 | 4/1998 |
| EP | 0994159 | A1 | 4/2000 |
| EP | 1006147 | A1 | 6/2000 |
| EP | 1077226 | A1 | 2/2001 |
| WO | 0190266 | A1 | 11/2001 |

* cited by examiner

*Primary Examiner*—Milton I Cano
*Assistant Examiner*—John Uselding
(74) *Attorney, Agent, or Firm*—Brooks Kushman P.C.

(57) ABSTRACT

Addition-crosslinkable silicone compositions contain
(A) 100 parts by weight of polydiorganosiloxane(s) which has alkenyl groups and whose viscosity is from 5000 to 50,000,000 mPas at 25° C., having at least 2 alkenyl groups per molecule, and at least 0.15 mol % of alkenyl-siloxane units, based on all siloxane units,
(B) from 1 to 50 parts by weight of polydiorganosiloxane(s) whose viscosity is at least 5,000,000 mPas at 25° C., and having no alkenyl groups,
(C) SiH-functional crosslinking agent(s),
(D) hydrosilylation catalyst(s), and
(E) from 3 to 90 parts by weight of filler(s) whose BET specific surface area is at least 50 m²/g. Vulcanizates of the addition-crosslinkable silicone compositions have low coefficients of friction.

6 Claims, No Drawings

ADDITION-CROSSLINKABLE SILICONE COMPOSITIONS WITH LOW COEFFICIENTS OF FRICTION

BACKGROUND OF THE INVENTION

1. Field of the Invention

The invention relates to addition-crosslinkable silicone compositions, the vulcanizates of which have low coefficients of friction, to their preparation, and to moldings composed of the crosslinked silicone compositions.

2. Background Art

It is known that addition of low-viscosity silicone oils which have some incompatibility with silicone elastomers can reduce the coefficient of friction of the elastomers. The additives are generally phenyl-containing silicone oils whose viscosity is from 5 to 1000 mPas, which are added to the uncrosslinked addition-crosslinking silicone composition. The phenyl-containing silicone oils have sufficient solubility in the uncrosslinked silicone composition to prevent phase separation. After crosslinking, the phenyl-containing silicone oils exude from the crosslinked silicone rubber, and an oily film thus forms on the surface over the course of time, reducing the coefficient of friction. The disadvantage of these mixtures is, however, that the oily friction reducing film is not formed immediately after crosslinking but only after some hours. Furthermore, the exudation rate is time- and temperature-dependent, and the coefficient of friction therefore depends on the storage conditions. Another problem with these systems is that the oil continues to exude, and constant oil content on the silicone surface is therefore achieved only after some weeks. Furthermore, the low-molecular-weight oil that has migrated to the surface is unbound and can simply be removed by wiping. This method cannot ensure a long lasting low coefficient of friction. Another consequence of the silicone oil migrating to the surface is that when the finished parts are conveyed the silicone oil film causes silicone-oil contamination of the conveyor belts, subsequently requiring complicated cleaning.

EP 649877 indicates that addition of incompatible low-viscosity silicone oils, e.g. silicone oils having dimethylsiloxy and diphenylsiloxy units or arylphosphoric esters, to addition-crosslinking or peroxidically crosslinking compositions can produce a lubricating film on the surface of the crosslinked silicone elastomer. However, this lubricating film is developed only after one day, and the coefficient of friction is therefore reduced only after storage of the crosslinked parts.

SUMMARY OF THE INVENTION

It is therefore an object of the present invention to provide addition-crosslinkable silicone compositions which crosslink to give silicone elastomers with a low coefficient of friction, where no greasy oil film forms on the surface of the silicone elastomer, and where the coefficient of friction is reduced immediately after crosslinking. These and other objects are achieved by providing addition-crosslinkable organopolysiloxane compositions containing a high viscosity polydiorganosiloxane free of alkenyl groups.

DETAILED DESCRIPTION OF THE PREFERRED EMBODIMENT(S)

The invention thus provides addition-crosslinkable silicone compositions, comprising (A) 100 parts by weight of polydiorganosiloxane(s) having at least 2 alkenyl groups per molecule, whose viscosity is from 5000 to 50,000,000 mPas at 25° C., and having at least 0.15 mol % of alkenylsiloxane units based on all of the siloxane units, (B) from 1 to 50 parts by weight of polydiorganosiloxane(s) having no alkenyl groups, whose viscosity is at least 5,000,000 mPas at 25° C., (C) SiH-functional crosslinking agent(s), (D) hydrosilylation catalyst(s), and (E) from 3 to 90 parts by weight of filler(s) whose BET specific surface area is at least 50 m²/g.

Use of the polydiorganosiloxane (A) containing alkenyl groups in combination with the non-functionalized polydiorganosiloxane (B) gives silicone elastomers which have a reduced coefficient of friction, without using low-viscosity silicone oils that exude and which form an oily film on the silicone surface. However, use of the non-functionalized polydiorganosiloxane (B) does not impair the other mechanical properties of the cured elastomer.

The location of the alkenyl groups in the polydiorganosiloxane (A) can be at the chain end, or along the chain, or both at the chain end and along the chain. It is also possible to use a mixture composed of different polydiorganosiloxanes (A), but here each polymer molecule must have at least two alkenyl groups and there must be on average at least 0.15 mol % of alkenylsiloxane units present, based on all of the siloxane units.

One preferred polydiorganosiloxane (A1) containing alkenyl groups has a viscosity of at least 5000 mPas at 25° C., more preferably at least 10,000 mPas, and preferably at most 2,000,000 mPas, more preferably at most 1,000,000 mPas. Preference is given to alkenyl groups located at the chain ends.

Another preferred polydiorganosiloxane (A2) containing alkenyl groups has a viscosity of at least 2,000,000 mPas at 25° C., more preferably at least 9,000,000 mPas, and preferably at most 50,000,000 mPas, more preferably at most 45,000,000 mPas, and most preferably at most 40,000,000 mPas. Preference in this case is given to alkenyl groups located at the chain ends and along the chain.

The polydiorganosiloxane (A) containing alkenyl groups is preferably composed of at least two units which are selected from the general formulae (1) and (2)

$$[R_2R^1SiO_{1/2}] \quad (1),$$

$$[RR^1SiO_{2/2}] \quad (2),$$

and further units which are selected from the general formulae (3) and (4)

$$[R_3SiO_{1/2}] \quad (3),$$

$$[R_2SiO_{2/2}] \quad (4),$$

where

R are monovalent, optionally halogen- or cyano-substituted $C_1$-$C_{18}$ hydrocarbon moieties bonded by way of SiC bonds and free from aliphatic carbon-carbon multiple bonds, and $R^1$ are monovalent, optionally halogen- or cyano-substituted, $C_2$-$C_{10}$-alkenyl groups, optionally bonded by way of an organic divalent group to silicon.

Examples of unsubstituted hydrocarbon moieties R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; cycloalkyl radicals such as cyclopentyl, cyclohexyl, 4-ethylcyclohexyl, and cycloheptyl radicals, norbornyl radicals, and methylcyclohexyl radicals; aryl radicals such as the phenyl, biphenylyl, naphthyl, anthryl, and phenanthryl radicals; alkaryl radicals such as the o-, m-, and p-tolyl radicals, xylyl radicals, and ethylphenyl radicals; aralkyl radicals such as the benzyl radical, the α- and the β-phenylethyl radicals, and the fluorenyl radical.

Examples of substituted hydrocarbon radicals as radicals R are halogenated hydrocarbons, e.g. the chloromethyl, 3-chloropropyl, 3-bromopropyl, 3,3,3-trifluoropropyl, and 5,5,5,4,4,3,3-heptafluoropentyl radicals, and also the chlorophenyl, dichlorophenyl, and trifluorotolyl radicals.

The hydrocarbon radicals R is preferably an unsubstituted or substituted $C_1$-$C_6$-alkyl radical or the phenyl radical, in particular the methyl and phenyl radicals.

The alkenyl groups $R^1$ may participate in an addition reaction with the SiH functional crosslinking agent (C). Alkenyl groups having from 2 to 6 carbon atoms are usually used, examples being vinyl, allyl, methallyl, 1-propenyl, 5-hexenyl, ethynyl, butadienyl, hexadienyl, cyclopentenyl, cyclopentadienyl, and cyclohexenyl, preferably vinyl and allyl.

Organic divalent groups by means of which the alkenyl groups $R^1$ may be bonded to silicon of the polymer chain may be composed, for example, of oxyalkylene units, such as those of the general formula (5)

$$—(O)_m[(CH_2)_nO]_o— \quad (5)$$

in which
m is 0 or 1, in particular 0,
n is from 1 to 4, in particular 1 or 2, and
o is from 1 to 20, in particular from 1 to 5.

The oxyalkylene units of the general formula (5) are bonded to a silicon atom on the left-hand side of the formula depicted above.

The polydiorganosiloxane (B) is preferably composed of units of the above general formulae (3) and (4). It is preferable that the polydiorganosiloxane (B) has, at 25° C., a viscosity of at least 7,000,000 mPas, more preferably at least 9,000,000 mPas, and preferably at most 40,000,000 mPas, in particular at most 35,000,000 mPas. It is also preferable that the OH content of the polydiorganosiloxane (B), based on Si-bonded OH groups, is at most 100 ppm by weight. The OH content is more preferably at most 50 ppm by weight. It is further preferable that at least 80%, and more preferable that at least 90%, of the groups R of (B) are the same as the groups R of (A).

The SiH-functional crosslinking agent (C) is preferably an organosilicon compound, or a mixture composed of at least two organosilicon compounds, which contain, per molecule, at least two, preferably at least three, hydrogen atoms bonded to silicon. Preference is given to the use of an SiH-functional crosslinking agent (C) containing three or more SiH bonds per molecule. The hydrogen content of the SiH-functional crosslinking agent (C), based exclusively on the hydrogen atoms directly bonded to silicon atoms, is preferably in the range from 0.002 to 1.7% by weight of hydrogen, more preferably from 0.1 to 1.7% by weight of hydrogen.

It is preferable that the SiH-functional crosslinking agent (C) contains at least three and at most 600 silicon atoms per molecule. It is more preferable to use SiH-functional crosslinking agent(s) (C) which contain from 4 to 200 silicon atoms per molecule. The structure of the SiH-functional crosslinking agent (C) can be linear, branched, cyclic, or network-like.

The amount of the SiH-functional crosslinking agent (C) present in the crosslinkable silicon composition is preferably such that the molar ratio of SiH groups to carbon-carbon multiple bonds is at least 1.1:1, more preferably from 1.1 to 5:1, and most preferably from 1.1 to 3:1. The carbon-carbon multiple bonds derive from the alkenyl groups of the polyorganosiloxanes (A) and, if appropriate, from carbon-carbon multiple bonds of the fillers (E) or additives (F).

The hydrosilylation catalyst (D) used can comprise any catalysts which catalyze the hydrosilylation reactions that proceed during the crosslinking of addition-crosslinking silicone compositions. Hydrosilylation catalysts (D) preferably used comprise metals and their compounds from the group of platinum, rhodium, palladium, ruthenium, and iridium.

It is preferable to use platinum and platinum compounds. Particular preference is given to those platinum compounds which are soluble in polyorganosiloxanes. Examples of soluble platinum compounds that can be used are the platinum-olefin complexes of the formulae $(PtCl_2.olefin)_2$ and $H(PtCl_3.olefin)$, preference being given to use of alkenes having from 2 to 8 carbon atoms, e.g. ethylene, propylene, and isomers of butene and of octene, or cycloalkenes having from 5 to 7 carbon atoms, e.g. cyclopentene, cyclohexene, and cycloheptene. Other soluble platinum catalysts are the platinum-cyclopropane complex of the formula $(PtCl_2C_3H_6)_2$, the reaction products of hexachloroplatinic acid with alcohols, with ethers, and with aldehydes, and, respectively, mixtures of the same, or the reaction product of hexachloroplatinic acid with methylvinylcyclotetrasiloxane in the presence of sodium bicarbonate in ethanolic solution. Particular preference is given to complexes of platinum with vinylsiloxanes, such as sym-divinyltetramethyldisiloxane. Other compounds that are very suitable are the platinum compounds described in EP 1 077 226 A1, equivalent to U.S. Pat. No. 6,359,098 B1 and EP 0 994 159 A1, equivalent to U.S. Pat. No. 6,252,028 B1, the disclosures of which in this connection are expressly incorporated by way of reference into this application.

The hydrosilylation catalyst (D) can be used in any desired form, and by way of example can also be in the form of microcapsules comprising hydrosilylation catalyst, or of polyorganosiloxane particles as described in EP 1 006 147 A1, equivalent to U.S. Pat. No. 6,251,969 B1, the disclosure of which in this connection is also expressly incorporated herein by way of reference.

The content of hydrosilylation catalysts (D) is preferably selected in such a way that the Pt content of the addition-crosslinkable silicone composition is from 0.1 to 200 ppm, in particular from 0.5 to 40 ppm.

The reinforcing filler (E) is preferably selected from the group consisting of precipitated and fumed silicas, and also carbon black. Preference is given to precipitated and fumed silicas, and to mixtures of the same. Particular preference is given to fumed silica surface-treated with silylating agent. The silica can have been hydrophobized either prior to incorporation into the polyorganosiloxane (A) or (B) or else in the presence of a polyorganosiloxane by the in-situ process. Both processes can be conducted as a batch process or else continuously. Silylating agents that can be used are any of the hydrophobizing agents known to the person skilled in the art. These are preferably silazanes, in particular hexamethyldisilazane and/or 1,3-divinyl-1,1,3,3-tetramethyldisilazane, and/or polysilazanes, and water can also be used here. Other silylating agents can also be used, examples being SiOH— and/or SiCl—, and/or alkoxy-functional silanes and, respectively, siloxanes, as hydrophobizing agents. Cyclic, linear, or branched non-functional organosiloxanes can likewise be used, examples being octamethylcyclotetrasiloxane or polydimethylsiloxane, in each case being used alone or in addition to silazanes as silylating agents. To accelerate hydrophobization, it is also possible to add catalytically active additives such as hydroxides. The hydrophobization can take place in one step using one or more hydrophobizing agents, or else in a plurality of steps using one or more hydrophobizing agents.

Preference is given to precipitated or fumed silicas. Particular preference is given to a silica whose BET specific surface area is from 80 to 400 m$^2$/g, more preferably from 100 to 400 m$^2$/g. The silicone compositions preferably comprise at least 3% by weight, more preferably at least 5% by weight, and in particular at least 10% by weight, and preferably at most 40% by weight, of filler content (E), based in each case on constituents (A)+(B)+(C).

The silicone compositions can optionally comprise, as further constituent(s) (F), from 0 to 70% by weight, preferably from 0.0001 to 40% by weight, of possible additives. These additives can by way of example be resin-like polyorganosiloxanes which differ from the polyorganosiloxanes (A) and (B), or can be dispersing agents, solvents, coupling agents, pigments, dyes, plasticizers, organic polymers, heat stabilizers, inhibitors, etc. Other constituents that can be present are those providing thixotropic properties, examples being fine-particle silica or other commercially available additives with thixotropic effect. Another constituent (F) that can be present for better crosslinking is preferably at most 0.5% by weight, more preferably at most 0.3% by weight, and in particular <0.1% by weight, of peroxide.

Other additives can be present which serve for controlled adjustment of processing time, onset temperature, and crosslinking rate of the crosslinking compositions. These inhibitors and stabilizers are very well known in the field of crosslinking compositions. Examples of other additives that can also be added are the sulfur compounds described in EP 0 834 534 A1, equivalent to U.S. Pat. No. 5,977,249 A, the disclosure of which in this connection is also expressly incorporated herein by way of reference, which improve compression set. It is also possible to add hollow bodies or expandable hollow bodies. Blowing agents can also be added to produce foams.

The present invention also provides a process for the preparation of the addition-crosslinkable silicone compositions, a process for the production of the crosslinked silicone elastomers from the addition-crosslinkable silicone compositions, and the resultant silicone elastomer moldings.

The ultimate tensile strength of the crosslinked silicone elastomers is preferably at least 3 N/mm$^2$, more preferably at least 5 N/mm$^2$. The hardness of the crosslinked silicone elastomers is preferably from 28 to 90 Shore A, since as hardness decreases it becomes impossible to reduce the coefficient of friction to a very low level.

The preparation or compounding of the silicone compositions takes place via mixing of the polyorganosiloxanes (A) and (B), and filler (E). Crosslinking after addition of crosslinking agent (C) and hydrosilylation catalyst (D) preferably takes place via heating, preferably at from 30 to 250° C., with greater preference at at least 50° C., more preferably at least 100° C., and most preferably at from 150 to 210° C.

The addition-crosslinkable silicone compositions are suitable for the preparation of addition-crosslinking RTV, LSR and HTV compositions, where it is preferable that the first component comprises not only (A) and (E) but the hydrosilylation catalyst (D), and the second component comprises not only (A) and (E) but also the SiH crosslinking agent (C). (B) can be present either in the first or the second component, or in both components. If single-component catalysts are used, e.g. as described in EP 1 077 226 A1, equivalent to U.S. Pat. No. 6,359,098 B1 and EP 0 994 159 A1, equivalent to U.S. Pat. No. 6,252,028 B1, it is also possible to prepare single-component mixtures. However, two-component mixtures can also be used, where the first component comprises not only (A) and (B) but also (E) and (C), and the second component comprises the catalyst (D).

In this context, the moldings are preferably produced by means of injection molding from the inventive LSR compositions or HTV compositions, or by means of extrusion from the HTV compositions. By way of example, the addition-crosslinkable silicone compositions can be used in this way to obtain gaskets which in particular feature reduced coefficients of friction immediately after crosslinking. The reduced coefficient of friction makes it easier to install the moldings when the gaskets have to be inserted over a plastics part or metal part, as is the case, for example, with cable plugs. Hoses with low coefficient of friction can likewise be extruded.

The definitions of all of the above symbols in the above formulae are respectively independent of one another. The silicon atom is tetravalent in all of the formulae.

Unless otherwise stated, in the following inventive examples and comparative examples, all of the amounts and percentages are based on weight, and all of the reactions are carried out at a pressure of 0.10 MPa (abs.) and at a temperature of 20° C.

EXAMPLES

Example 1 (Non-inventive)

Preparation of Parent Composition:

260 g of a vinyldimethylsiloxy-terminated polydimethylsiloxane whose viscosity was 20,000 mPas (25° C.) and whose vinylsiloxy content was 0.33 mol % were used as initial charge in a laboratory kneader and heated to 150° C., and 170 g of a hydrophobic fumed silica whose BET specific surface area was 300 m$^2$/g and whose carbon content was 3.9% by weight were admixed, producing a high-viscosity composition which was then diluted with 130 g of a vinyldimethylsiloxy-terminated polydimethylsiloxane whose viscosity was 20,000 mPas (25° C.) and whose vinylsiloxy content was 0.33 mol %. Volatile constituents were removed within a period of one hour at 150° C. via kneading in vacuum (10 mbar).

Preparation of Crosslinkable Mixture:

0.50 g of ethynylcyclohexanol, 11.4 g of a copolymer composed of dimethylsiloxy units, methylhydrosiloxy units, and trimethylsiloxy units, whose viscosity was 100 mPas at 25° C. and whose SiH content was 0.48%, and also 0.48 g of a solution comprising platinum-sym-divinyltetramethyldisiloxane complex, the solution containing 1% by weight of Pt calculated as elemental Pt, were added to the 550 g of parent composition obtained above.

The silicone composition thus prepared was then crosslinked within a period of 5 minutes at a temperature of 165° C. in a hydraulic press.

Comparative Example C2 (Non-inventive)

As described in example 1, but 28.0 g of trimethylsiloxy-terminated polydimethylsiloxane whose viscosity was 35 mPas were also added during the preparation of the crosslinkable mixture. This mixture was crosslinked as described in example 1.

Comparative Example C3 (Non-inventive)

As described in example 1, but 28.0 g of trimethylsiloxy-terminated polydimethylsiloxane whose viscosity was 100,000 mPas were also added during the preparation of the crosslinkable mixture. This mixture was crosslinked as described in example 1.

Example 4(inventive)

As described in example 1, but 28.0 g of trimethylsiloxy-terminated polydimethylsiloxane whose viscosity was 20,000,000 mpas were also added during the preparation of the crosslinkable mixture. This mixture was crosslinked as described in example 1.

Example 5 (inventive)

As described in example 1, but 20.0 g of trimethylsiloxy-terminated polydimethylsiloxane whose viscosity was 10,000,000 mpas were also added during the preparation of the crosslinkable mixture. This mixture was crosslinked as described in example 1.

Comparative Example C6 (Non-inventive)

In contrast to example 1, in the preparation of the parent composition, vinyldimethylsiloxy-terminated polydimethylsiloxane of a viscosity of 20,000 and whose vinylsiloxy content was 0.33 mol % was substituted with a vinyldimethylsiloxy-terminated polydimethylsiloxane whose viscosity was 500,000 mPas (25° C.) and whose vinylsiloxy content was 0.11 mol %.

The crosslinkable mixture was prepared as described in example 1, but 28.0 g of trimethylsiloxy-terminated polydimethylsiloxane whose viscosity was 20,000,000 mPas were also added. This mixture was crosslinked as described in example 1.

Comparative Example C7 (Non-inventive)

As described in example 1, but 28.0 g of trimethylsiloxy-terminated polydiorganosiloxane having 33 mol % of diphenylsiloxy units and 66 mol % of dimethylsiloxy units whose viscosity was 200 mPas (25° C.) were also added during the preparation of the crosslinkable mixture. This mixture was crosslinked as described in example 1.

Comparative Example C8 (Non-inventive)

As described in example 1, but 28.0 g of a polydimethylsiloxane whose viscosity was 20,000,000 mPas and whose chain end bears an average of one trimethylsiloxy group and one vinyldimethylsiloxy group were also added during preparation of the crosslinkable mixture. This mixture was crosslinked as described in example 1.

Comparative Example C9 (Non-inventive)

As described in example 1, but 28.0 g of a trimethylsiloxy-terminated polydimethylsiloxane whose viscosity was 20,000,000 mPas and whose polymer chain bears an average of two vinylmethylsiloxy groups were also added during the preparation of the crosslinkable mixture. This mixture was crosslinked as described in example 1.

Table 1 shows that use of a vinyl-free, high-viscosity polydiorganosiloxane in combination with a vinyl-containing polydiorganosiloxane having high vinyl content gives, directly after crosslinking, a silicone elastomer with reduced coefficient of friction. During storage, no greasy oil film forms on the surface of the crosslinked silicone elastomer when these mixtures are used.

TABLE 2

| Example | Hardness [Shore A] | Tear-propagation resistance (ASTM D624) [N/mm] | Ultimate tensile strength [N/mm$^2$] | Elongation at break [%] |
| --- | --- | --- | --- | --- |
| 1* | 42 | 22 | 9.8 | 650 |
| C2* | 36 | 17 | 7.1 | 630 |
| C3* | 38 | 19 | 8.2 | 610 |
| 4 | 41 | 28 | 9.7 | 750 |
| 5 | 39 | 27 | 9.9 | 740 |
| C7* | 36 | 19 | 7.5 | 620 |

*Non-inventive

Table 2 shows that use of a vinyl-free high-viscosity polydiorganosiloxane in combination with a vinyl-containing polydiorganosiloxane having high vinyl content not only reduces coefficient of friction as shown in Table 1 but also improves mechanical properties, e.g. tear-propagation resistance and elongation at break.

Example 10 (Non-inventive)

Preparation of Parent Composition:

390 g of a vinyldimethylsiloxy-terminated polydimethylsiloxane whose viscosity was 20,000,000 mPas, which also contains vinylmethylsiloxy units in the polymer chain, where the content of vinylsiloxy units is 0.10 mol %, were heated to 150° C. in a laboratory kneader, and 170 g of a hydrophobic fumed silica whose BET specific surface area was 300 m$^2$/g and whose carbon content was 3.9% by weight were admixed. Volatile constituents were removed within the period of one hour at 150° C. via kneading in vacuum (10 mbar).

Preparation of Crosslinkable Mixture:

0.50 g of ethynylcyclohexanol, 11.4 g of a copolymer composed of dimethylsiloxy units, methylhydrosiloxy units, and trimethylsiloxy units, whose viscosity was 100 mPas at

TABLE 1

| Example | Hardness [Shore A] | Coefficient of friction 30 minutes after crosslinking of silicone elastomer | Oil film on surface of silicone elastomer after crosslinking? | Coefficient of friction after one day of storage | Oil film on surface of silicone elastomer after one day of storage? |
| --- | --- | --- | --- | --- | --- |
| 1* | 42 | 2.5 | No | 2.6 | No, dry |
| C2* | 36 | 2.5 | No | 2.5 | No, dry |
| C3* | 38 | 2.4 | No | 0.8 | Yes, oily |
| 4 | 40 | 1.2 | No | 1.2 | No, dry |
| 5 | 41 | 1.1 | No | 1.1 | No, dry |
| C6* | 37 | 2.2 | No | 2.2 | No, dry |
| C7* | 36 | 2.4 | No | 0.7 | Yes, oily |
| C8* | 40 | 2.1 | No | 2.2 | No, dry |
| C9* | 41 | 2.3 | No | 2.2 | No, dry |

*Non-inventive

25° C. and whose SiH content was 0.48%, and also 0.48 g of a solution comprising platinum-sym-divinyltetramethyldisiloxane complex, where the solution contains 1% by weight of Pt, were added to the 550 g of parent composition obtained above.

The silicone composition thus prepared was then crosslinked within a period of 5 minutes at a temperature of 165° C. in a hydraulic press.

Comparative Example C11 (Non-inventive)

As described in example 10, but 28.0 g of trimethylsiloxy-terminated polydimethylsiloxane whose viscosity was 20,000,000 mPas were also added during the preparation of the crosslinkable mixture. This mixture was crosslinked as described in example 10.

Comparative Example C12 (Non-inventive)

As described in example 10, but preparation of the parent composition used a vinyldimethylsiloxy-terminated polydimethylsiloxane whose viscosity was 20,000,000 mPas, whose polymer chain also contains vinylmethylsiloxy units, where the content of vinylsiloxy units was 0.25 mol %. Preparation of the Crosslinkable Mixture and Crosslinking of the addition-crosslinking composition took place as described in example 10.

Example 13 (inventive)

As described in example 10, but a vinyldimethylsiloxy-terminated polydimethylsiloxane whose viscosity was 20,000,000 mPas and whose polymer chain also contains vinylmethylsiloxy units, the content of vinylsiloxy units being 0.25 mol %, was used during the preparation of the parent composition. The crosslinkable mixture was prepared as described in example 10, but 28.0 g of trimethylsiloxy-terminated polydimethylsiloxane whose viscosity was 20,000,000 mPas were also added. This mixture was crosslinked as described in example 10.

polydiorganosiloxane having high vinyl content gives, directly after crosslinking, a silicone elastomer with reduced coefficient of friction. No greasy oil film is formed on the surface of the crosslinked silicone elastomer during storage when these mixtures are used.

Example 14 (Non-inventive)

Preparation of Parent Composition:

As described in example 1, but instead of 170 g only 80 g of the hydrophobic fumed silica whose BET specific surface area was 300 $m^2/g$ and whose carbon content was 3.9% by weight were used during preparation of the parent composition.

Preparation of Addition-Crosslinking Mixture:

Preparation of the addition-crosslinking mixture did not use, as described in example 1, 11.4 g of the SiH crosslinking agent used in example 1, but only 7.1 g. Crosslinking of the addition-crosslinking mixture took place as described in example 1.

Example 15 (inventive)

As described in example 14, but 28.0 g of trimethylsiloxy-terminated polydimethylsiloxane whose viscosity was 20,000,000 mPas were also added during the preparation of the crosslinkable mixture. This mixture was crosslinked as described in example 1.

Comparative Example C16 (Non-inventive)

As described in example 1, but instead of 170 g 210 g of the hydrophobic fumed silica whose BET specific surface area was 300 $m^2/g$ and whose carbon content was 3.9% by weight were used during preparation of the parent composition. In contrast to the hydrophobic fumed silica used in example 1 having no vinyl groups on the silica, preparation of the parent composition used a silica partially functionalized with vinyldimethylsiloxy units.

Preparation of the addition-crosslinking mixture did not use, as described in example 1, 11.4 g of the SiH crosslinking agent used in example 1, but 17.2 g. Crosslinking of the addition-crosslinking mixture took place as described in example 1.

Example 17 (inventive)

As described in example 16, but 28.0 g of trimethylsiloxy-terminated polydimethylsiloxane whose viscosity was 20,000,000 mPas were also added during the preparation of

TABLE 3

| Example | Hardness [Shore A] | Coefficient of friction 30 minutes after crosslinking of silicone elastomer | Oil film on surface of silicone elastomer after crosslinking? | Coefficient of friction after one day of storage | Oil film on surface of silicone elastomer after one day of storage? |
|---------|--------------------|-----|-----|-----|---------|
| 10*     | 41 | 2.5 | No | 2.6 | No, dry |
| C11*    | 38 | 2.4 | No | 2.5 | No, dry |
| C12*    | 44 | 2.5 | No | 2.4 | No, dry |
| 13      | 40 | 1.3 | No | 1.2 | No, dry |

*Non-inventive

Table 3 shows that use of a vinyl-free high-viscosity polydiorganosiloxane in combination with a vinyl-containing the crosslinkable mixture. This mixture was crosslinked as described in example 1.

TABLE 4

| Example | Hardness [Shore A] | Coefficient of friction 30 minutes after crosslinking of silicone elastomer | Oil film on surface of silicone elastomer after crosslinking? | Coefficient of friction after one day of storage | Oil film on surface of silicone elastomer after one day of storage? |
|---|---|---|---|---|---|
| 14* | 23 | 3.0 | No | 2.8 | No, dry |
| 15 | 20 | 2.1 | No | 2.0 | No, dry |
| 1* | 42 | 2.5 | No | 2.6 | No, dry |
| 4 | 40 | 1.2 | No | 1.2 | No, dry |
| C16* | 72 | 1.1 | No | 1.1 | No, dry |
| 17 | 67 | 0.7 | No | 0.7 | No, dry |

*Non-inventive

Table 4 shows that use of a vinyl-free, high-viscosity polydiorganosiloxane in combination with a vinyl-containing polydiorganosiloxane having high vinyl content gives, directly after crosslinking, a silicone elastomer with reduced coefficient of friction. No greasy oil film forms on the surface of the crosslinked silicone elastomer during storage when these mixtures are used. Low coefficients of friction can in particular be achieved in the hardness region from 30 to 90 Shore A.

Silicone elastomer properties were characterized to DIN 53505 (Shore A), DIN 53504-S1 (ultimate tensile strength and elongation at break), and ASTM D624B (tear-propagation resistance).

Coefficient of friction was determined as follows: crosslinked silicone elastomer foils (80×30 mm) of thickness 2 mm were fastened to a metal slider using a weight of 190 g and a contact area of 24 cm$^2$, and drawn at a velocity of 100 cm/min over a steel plate. Coefficient of friction was calculated from the following formula: μ=frictional force/weight.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An addition-crosslinkable silicone composition, comprising
   (A) 100 parts by weight of polydiorganosiloxane(s) having at least 2 alkenyl groups per molecule, whose viscosity is from 2,000,000 to 50,000,000 mPas at 25° C., and having at least 0.15 mol% of alkenylsiloxane units, based on all of the siloxane units,
   (B) from 1 to 50 parts by weight of polydiorganosiloxane(s) having no alkenyl groups and whose viscosity is at least 5,000,000 mPas at 25° C.,
   (C) at least one SiH-functional crosslinking agent,
   (D) at least one hydrosilylation catalyst, and
   (E) from 3 to 90 parts by weight of at least one filler whose BET specific surface area is at least 50 m$^2$/g.

2. The composition of claim 1, wherein at least one polydiorganosiloxane (A) has a viscosity of from 9,000,000 to 40,000,000 mPas.

3. The composition of claim 1, wherein polydiorganosiloxane(s) (B) have a viscosity of 7,000,000 to 40,000,000 mPas.

4. The composition of claim 2, wherein polydiorganosiloxane(s) (B) have a viscosity of 7,000,000 to 40,000,000 mPas.

5. The composition of claim 1, wherein polydiorganosiloxane(s) (B) have a viscosity of 9,000,000 to 35,000,000 mPas.

6. The composition of claim 3, wherein polydiorganosiloxane(s) (B) have a viscosity of 9,000,000 to 35,000,000 mPas.

* * * * *